US009672107B1

(12) United States Patent
Horn

(10) Patent No.: US 9,672,107 B1
(45) Date of Patent: Jun. 6, 2017

(54) DATA PROTECTION FOR A DATA STORAGE DEVICE

(71) Applicant: Western Digital Technologies, Inc., Irvine, CA (US)

(72) Inventor: Robert L. Horn, Yorba Linda, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 163 days.

(21) Appl. No.: 14/619,968

(22) Filed: Feb. 11, 2015

(51) Int. Cl.
G11C 29/00 (2006.01)
G06F 11/10 (2006.01)
G06F 11/08 (2006.01)
G06F 12/0873 (2016.01)
G06F 3/06 (2006.01)

(52) U.S. Cl.
CPC .......... G06F 11/1076 (2013.01); G06F 11/08 (2013.01); G06F 11/1068 (2013.01); G06F 12/0873 (2013.01); G06F 3/0674 (2013.01)

(58) Field of Classification Search
CPC .. G06F 11/08; G06F 11/1068; G06F 11/1076; G06F 3/0673; G06F 3/0674; G06F 3/0679; G06F 12/0873
See application file for complete search history.

(56) References Cited

U.S. PATENT DOCUMENTS

| 5,696,934 | A | * | 12/1997 | Jacobson | G06F 3/0601 711/E12.014 |
|---|---|---|---|---|---|
| 6,018,789 | A | | 1/2000 | Sokolov et al. | |
| 6,065,095 | A | | 5/2000 | Sokolov et al. | |
| 6,078,452 | A | | 6/2000 | Kittilson et al. | |
| 6,081,447 | A | | 6/2000 | Lofgren et al. | |
| 6,092,149 | A | | 7/2000 | Hicken et al. | |
| 6,092,150 | A | | 7/2000 | Sokolov et al. | |
| 6,094,707 | A | | 7/2000 | Sokolov et al. | |
| 6,105,104 | A | | 8/2000 | Guttmann et al. | |
| 6,111,717 | A | | 8/2000 | Cloke et al. | |
| 6,145,052 | A | | 11/2000 | Howe et al. | |
| 6,175,893 | B1 | | 1/2001 | D'Souza et al. | |
| 6,178,056 | B1 | | 1/2001 | Cloke et al. | |
| 6,191,909 | B1 | | 2/2001 | Cloke et al. | |
| 6,195,218 | B1 | | 2/2001 | Guttmann et al. | |
| 6,205,494 | B1 | | 3/2001 | Williams | |
| 6,208,477 | B1 | | 3/2001 | Cloke et al. | |
| 6,223,303 | B1 | | 4/2001 | Billings et al. | |
| 6,230,233 | B1 | | 5/2001 | Lofgren et al. | |
| 6,246,346 | B1 | | 6/2001 | Cloke et al. | |
| 6,249,393 | B1 | | 6/2001 | Billings et al. | |
| 6,256,695 | B1 | | 7/2001 | Williams | |
| 6,262,857 | B1 | | 7/2001 | Hull et al. | |
| 6,263,459 | B1 | | 7/2001 | Schibilla | |
| 6,272,694 | B1 | | 8/2001 | Weaver et al. | |
| 6,278,568 | B1 | | 8/2001 | Cloke et al. | |
| 6,279,089 | B1 | | 8/2001 | Schibilla et al. | |

(Continued)

Primary Examiner — Shelly A Chase

(57) ABSTRACT

Managing data stored in a Data Storage Device (DSD) including a plurality of disk surfaces for storing data. Head mapping information is received from the DSD associating addresses for data with different disk surfaces of the plurality of disk surfaces, and data is stored on a first disk surface of the plurality of disk surfaces. Redundant data for the data stored on the first disk surface is stored on a second disk surface of the plurality of disk surfaces using the head mapping information.

31 Claims, 10 Drawing Sheets

(56) References Cited

U.S. PATENT DOCUMENTS

| | | |
|---|---|---|
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |

(56) References Cited

U.S. PATENT DOCUMENTS

| | | |
|---|---|---|
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,127,549 B2 * | 10/2006 | Sinclair ............ G06F 3/0613 711/100 |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |

(56) References Cited

U.S. PATENT DOCUMENTS

| | | |
|---|---|---|
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,601,311 B2 | 12/2013 | Horn |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 8,902,527 B1 * | 12/2014 | Coker ............... G11B 5/5521 360/48 |
| 2009/0113702 A1 | 5/2009 | Hogg |
| 2010/0131723 A1 * | 5/2010 | Yorimitsu ........... G06F 3/0626 711/154 |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0003211 A1 * | 1/2013 | Kawaguchi ......... G06F 11/1076 360/39 |
| 2014/0201424 A1 | 7/2014 | Chen et al. |

\* cited by examiner

| Head | Used LBAs | Unused LBAs |
|---|---|---|
| 154 | A, E, I | M, Q, U |
| 156 | B, F, J | N, R, V |
| 158 | C, G, K | O, S, W |
| 160 | D, H, L | P, T, X |

DATA PROTECTION FOR A DATA STORAGE DEVICE

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk, such as in a Hard Disk Drive (HDD). After writing data on the disk surface, errors may be encountered when trying to access the data written on the disk surface. The errors can be caused by, for example, portions of the disk surface or the head becoming defective, or by more transient causes such as an interruption when writing the data on the disk surface (e.g., a write splice).

Although redundancy schemes exist for protecting data when one or more HDDs in an array of HDDs fail, such as in a Redundant Array of Independent Disks (RAID), these schemes require multiple HDDs. This type of data redundancy may be impractical in applications such as notebook computing. Thus, there is a need to provide for data redundancy within a single DSD.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 3 is a conceptual diagram providing an example of head mapping information according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
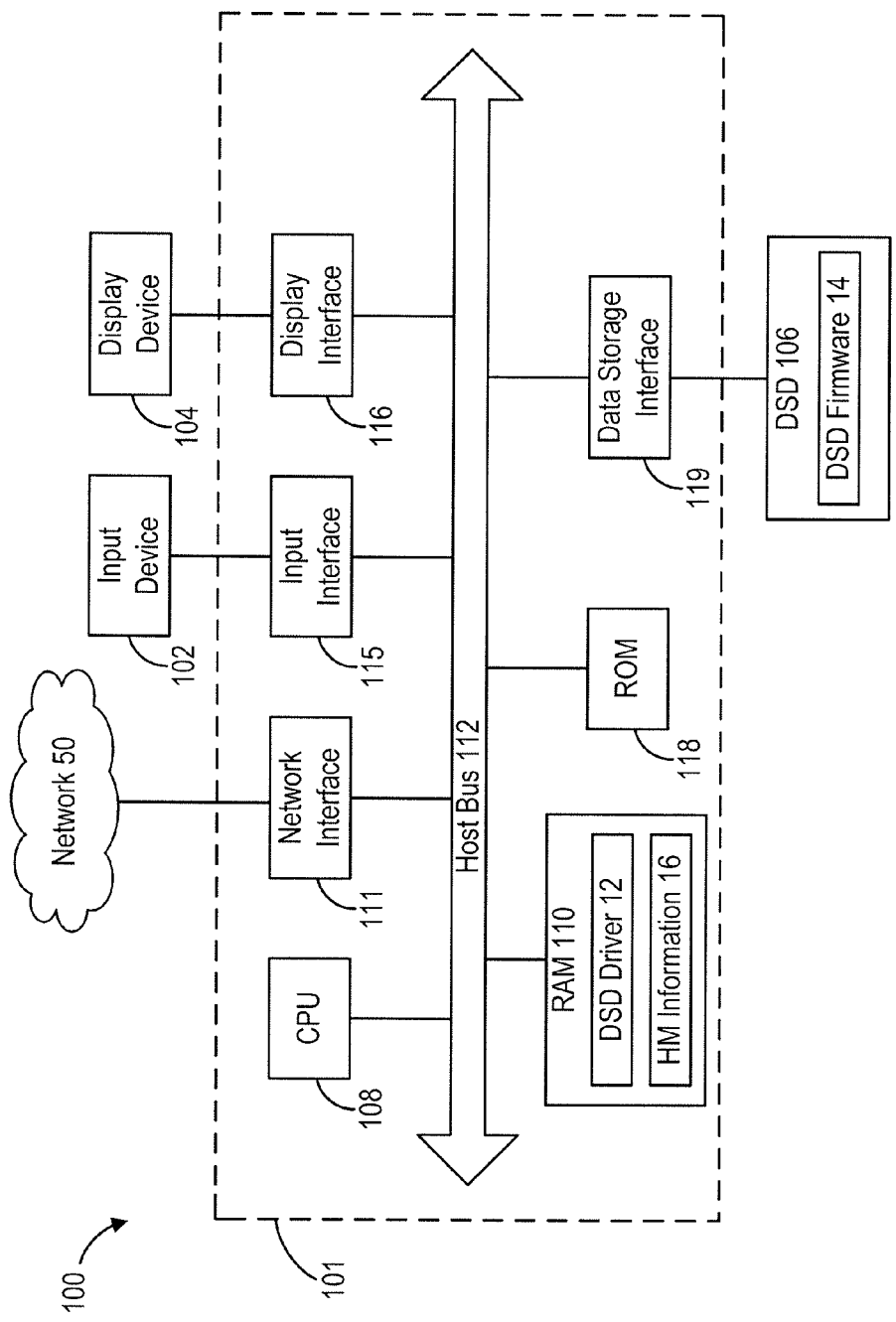
FIG. 1 is a block diagram depicting a system with a Data Storage Device (DSD) according to an embodiment.

FIG. 1 shows system 100 according to an embodiment which includes host 101, input device 102, display device 104 and Data Storage Device (DSD) 106. System 100 can be, for example, a computer system (e.g., server, desktop, mobile/laptop, tablet, smartphone, etc.) or other electronic device such as a Digital Video Recorder (DVR). In this regard, system 100 may be a stand-alone system or part of a network, such as network 50, which can, for example, be a local or wide area network, or the Internet.

Those of ordinary skill in the art will appreciate that system 100 can include more or less than those elements shown in FIG. 1 and that the disclosed processes can be implemented in other environments Input device 102 can be a keyboard, scroll wheel, or pointing device allowing a user of system 100 to enter information and commands to system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes Central Processing Unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. A processor of host 101 as referenced hereinafter can be one or more of the foregoing processors or another processor configured to perform functions described herein. CPU 108 interfaces with host bus 112. Also interfacing with host bus 112 are Random Access Memory (RAM) 110, input interface 115 for input device 102, display interface 116 for display device 104, Read Only Memory (ROM) 118, network interface 111, and data storage interface 119 for DSD 106.

RAM 110 represents a volatile memory of host 101 that interfaces with host bus 112 to provide information stored in RAM 110 to CPU 108 during execution of instructions in software programs such as DSD driver 12. More specifically, CPU 108 first loads computer-executable instructions from DSD 106 into a region of RAM 110. CPU 108 can then execute the stored process instructions from RAM 110. Data such as Head Mapping (HM) information 16 or data to be stored in or retrieved from DSD 106 can also be stored in RAM 110 so that the data can be accessed by CPU 108 during execution of software programs to the extent that such software programs have a need to access and/or modify the data.

As shown in FIG. 1, RAM 110 can be configured to store DSD driver 12 and HM information 16. DSD driver 12 provides a software interface for DSD 106 on host 101, and can cause CPU 108 to perform some of the processes discussed below.

HM information 16 can associate addresses for data with different disk surfaces of DSD 106 where the data is assigned for storage. In other words, HM information 16 can be used to indicate which disk surfaces are assigned to store data associated with different addresses. HM information 16 is described in more detail with reference to FIG. 3 below.

In some embodiments, the processes discussed below can be performed by a controller of DSD 106 (e.g., controller 120 of FIG. 2) by executing DSD firmware 14, which can include computer-executable instructions that control operation of DSD 106 when executed by the controller. DSD firmware 14 or portions thereof can be temporarily stored in a volatile memory of DSD 106 (e.g., volatile memory 140 in FIG. 2) for execution. In addition, DSD firmware 14 can be stored in a non-volatile memory of DSD 106 (e.g., disk 131 or disk 133 in FIG. 2). The processes may also be performed by CPU 108.

Data storage interface 119 is configured to interface host 101 with DSD 106, and can interface according to a Serial Advanced Technology Attachment (SATA) standard. In other embodiments, data storage interface 119 can interface with DSD 106 using other standards such as, for example, PCI express (PCIe) or Serial Attached SCSI (SAS).

Figure 2:
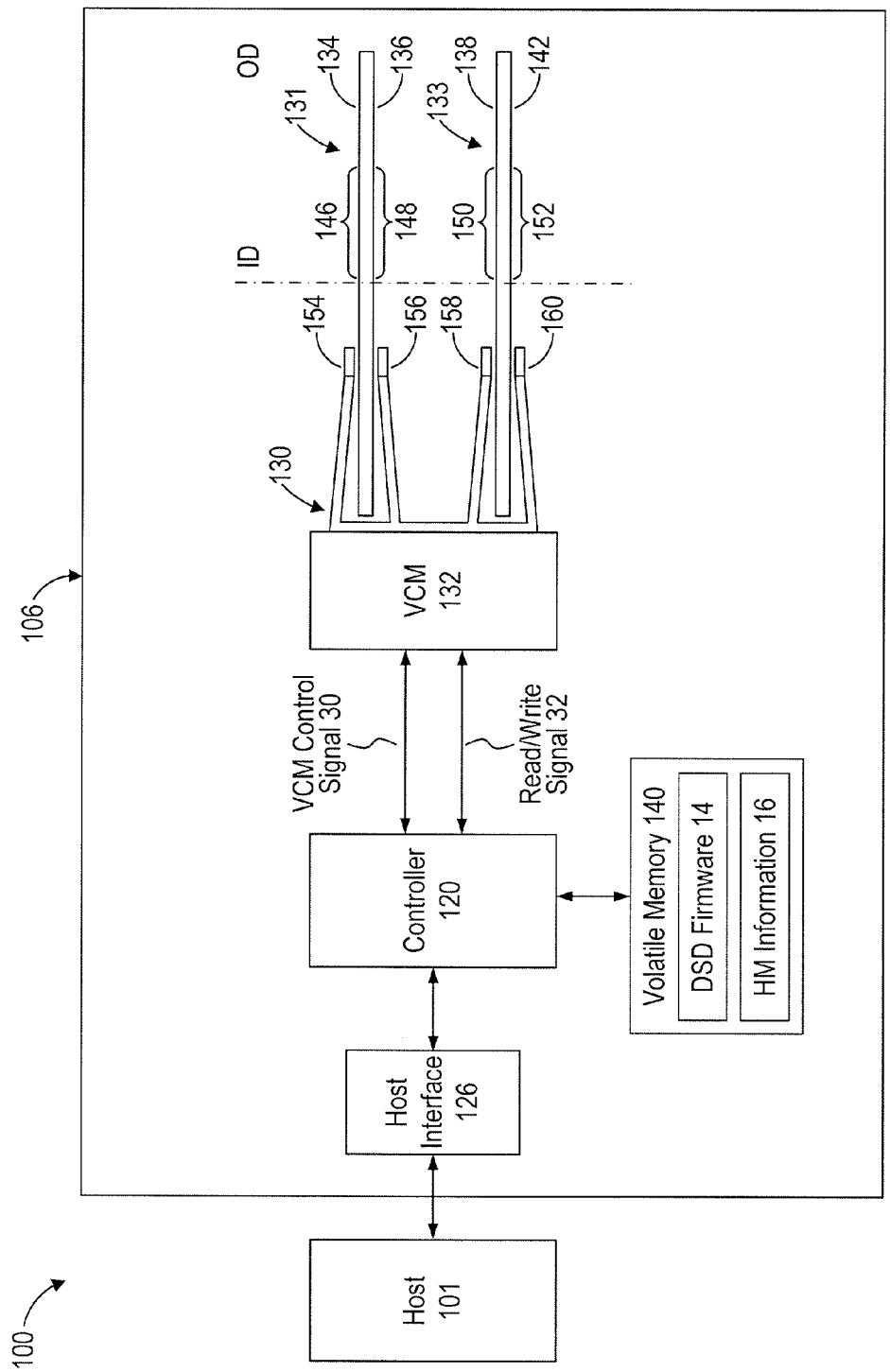
FIG. 2 is a block diagram depicting the DSD of FIG. 1 according to an embodiment.

FIG. 2 depicts a block diagram of DSD 106 according to an embodiment where DSD 106 includes Non-Volatile Memory (NVM) in the form of rotating magnetic disks 131 and 133. In other embodiments, DSD 106 may include a different number of disks or a different type of NVM such as a solid-state memory in addition to rotating magnetic disks.

DSD 106 includes controller 120 which includes circuitry such as one or more processors for executing instructions and can include a microcontroller, a DSP, an ASIC, an FPGA, hard-wired logic, analog circuitry and/or a combination thereof. In one implementation, controller 120 can include a system on a chip (SoC).

Host interface 126 is configured to interface DSD 106 with host 101 and may interface according to a standard such as, for example, PCIe, SATA, or SAS. As will be appreciated by those of ordinary skill in the art, host interface 126 can be included as part of controller 120. Although FIGS. 1 and 2 depict the co-location of host 101 and DSD 106, in other embodiments the two need not be physically co-located. In such embodiments, DSD 106 may be located remotely from host 101 and connected to host 101 via a network interface.

In the example of FIG. 2, disks 131 and 133 are rotated by a spindle motor (not shown) and heads 154, 156, 158, and 160 are positioned to read and write data on a corresponding disk surface of disks 131 or 133. Each of disk surfaces 134, 136, 138, and 142 includes a number of radially spaced, concentric tracks for storing data. In more detail, heads 154, 156, 158, and 160 are connected to the distal end of actuator 130 which is rotated by Voice Coil Motor (VCM) 132 to position heads 154, 156, 158, and 160 over tracks on disk surfaces 134, 136, 138, and 142, respectively. Controller 120 can include servo control circuitry (not shown) to control the rotation of disks 131 and 133, and control the position of the heads using VCM control signal 30.

Each of disk surfaces 134, 136, 138, and 142 includes a reserved area for storing redundant data for data written on other disk surfaces. As discussed in more detail below, the redundant data can include a copy of data written on another disk surface or parity data that can be used to reconstruct data written on another disk surface.

In the example of FIG. 2, reserved areas 146, 148, 150, and 152 are located near a central axis of disks 131 and 133 in an Inside Diameter (ID) portion of disks 131 and 133, since the ID portion is typically associated with a slower access time than other portions of the disk closer to the Outside Diameter (OD). The reserved areas may be located in an ID portion since the copies stored in the reserved areas may only be accessed when there is an error in accessing the primary data from a different disk surface. In other embodiments, one or more of reserved areas 146, 148, 150, and 152 may be located in a different portion of disks 131 and 133.

In FIG. 2, DSD 106 also includes volatile memory 140. Volatile memory 140 can include, for example, a Dynamic Random Access Memory (DRAM) which can be used by DSD 106 to temporarily store data. Data stored in volatile memory 140 can include data read from disks 131 and 133, data to be written to NVM, instructions loaded from firmware for execution by controller 120, and/or data used in executing firmware.

As shown in FIG. 2, volatile memory 140 is configured to store DSD firmware 14 and HM information 16. As discussed in more detail below, HM information 16 stored in RAM 110 of host 101 can be a copy of, or some derivative of, HM information 16 stored in volatile memory 140 of DSD 106. HM information 16 can indicate which disk surface stores data associated with a particular logical address.

In operation, host interface 126 receives host read and write commands from host 101 via host interface 126 for reading data from and writing data to NVM. In response to a write command from host 101, controller 120 may buffer the data to be written for the write command in volatile memory 140.

For data to be written on disk 131 or disk 133, a read/write channel (not shown) of controller 120 may then encode the buffered data into write signal 32 which is provided to a head for magnetically writing data to a corresponding disk surface.

In response to a read command for data stored on disk 131 or disk 133, controller 120 controls a head to magnetically read data stored on the disk surface and to send the read data as read signal 32. A read/write channel of controller 120 can then decode and buffer the data into volatile memory 140 for transmission to host 101 via host interface 126.

Data Protection Examples

FIG. 3 is a conceptual diagram providing an example of HM information 16 according to an embodiment. As shown in FIG. 3, HM information 16 includes entries for each of heads 154, 156, 158, and 160. The entries in the example of FIG. 3 associate addresses for data with different disk surfaces. More specifically, each of the entries includes pools of used Logical Block Addresses (LBAs) and pools of unused LBAs for each associated disk surface. The LBAs can be an addressing scheme used by host 101 for organizing and referring to data.

The pools of used LBAs, such as A, E, and I for head 154, can correspond to areas of disk surface 134 that have user data or data used by host 101 that is already stored on the disk surface. The pools of unused LBAs, such as M, Q, and U for head 154 can correspond to areas of disk surface 134 that do not yet have user data or data used by host 101 that is already stored on the disk surface. The pools of used or unused LBAs may include ranges of LBAs which can be specified, for example, with a starting LBA and a length. In addition, the length of such address ranges may differ depending upon the usage of the disk surfaces.

As discussed in more detail below, by using HM information 16 to identify the addresses assigned to each disk surface, it is ordinarily possible to identify available/unused space on disk surfaces and store redundant data on a different disk surface so as to protect the data stored in DSD 106. By storing the redundant data on a different disk surface, the data can ordinarily be protected against disk surface irregularities and possible problems that may occur with a particular head. This can generally improve the ability to recover important user files that may have otherwise been lost.

In addition, since a significant portion of disk surfaces typically remain unused in the average DSD, the storing of redundant data can be more routinely performed as a background activity to improve the perceived reliability of DSD 106 to a user of host 101. This can result in reduced warranty costs or returns of the DSD. For example, if most users only end up using half of the available data capacity of a DSD, the unused half of the DSD's data capacity can be reserved to store redundant data as user data is stored in the DSD. As DSD 106 approaches becoming half full, host 101 can then free up portions of the reserved areas and prioritize which data will have redundant data stored in DSD 106.

Figure 4:
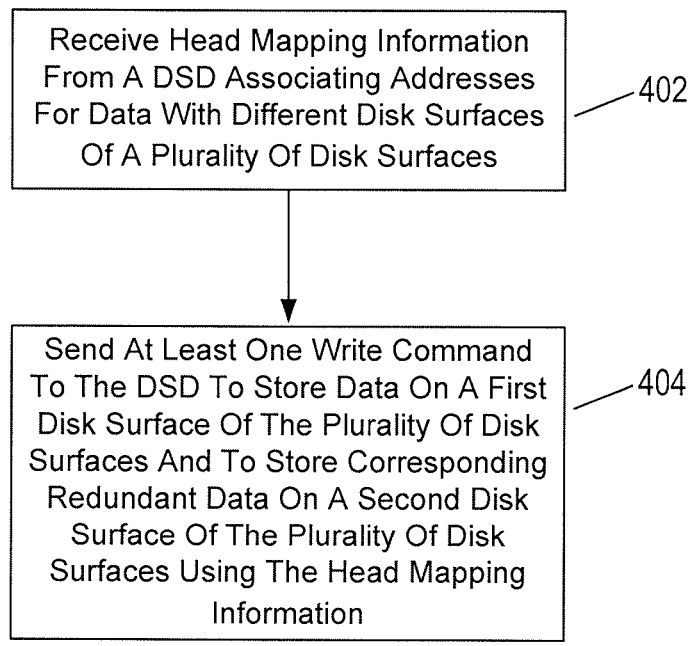
FIG. 4 is a flowchart for a data protection process according to an embodiment.

FIG. 4 is a flowchart for a data protection process that can be performed by CPU 108 of host 101 when executing DSD driver 12 according to an embodiment. In block 402, CPU 108 receives head mapping information 16 from DSD 106 via data storage interface 119. As discussed above, head mapping information 16 can associate LBAs for data with different disk surfaces or heads of DSD 106. The head mapping information may also indicate certain pools of used and unused LBAs for each disk surface.

In block 404, CPU 108 sends at least one write command to DSD 106 via data storage interface 119 to store data on a first disk surface of DSD 106 and to store corresponding redundant data on a second disk surface using head mapping information 16. In this regard, CPU 108 may send a first write command to store the data and then send a second write command to store the redundant data. In other embodiments, CPU 108 may send one write command for storing both the data and the redundant data.

In more detail, CPU 108 can identify an unused portion of the second disk surface based on head mapping information 16. In one implementation, an unused pool of LBAs may be provided from DSD 106 as part of head mapping information 16, as in the example of HM information 16 in FIG. 3. In another implementation, CPU 108 may identify LBAs for a particular disk surface using head mapping information 16 and then determine an unused portion of the LBAs for storing the redundant data with the use of DSD driver 12. In some implementations, DSD driver 12 can be used to monitor file system access to DSD 106 including a file type for accessed data, file LBA mapping, and used versus unused LBAs. In this regard, host 101 may also use a file system to assign LBAs to hidden files reserved for storing redundant data thereby determining reserved areas 146, 148, 150, and 152 for storing redundant data.

As noted above, the redundant data can include a copy of the data to provide data mirroring within DSD 106 or the redundant data can include parity data that can allow for reconstruction of the data using the parity data and data stored or to be stored on a third disk surface. The sequence diagrams of FIGS. 5A, 5B, 6A, and 6B discussed below provide example embodiments using either a copy of the data or parity data as the redundant data.

Figure 5A:
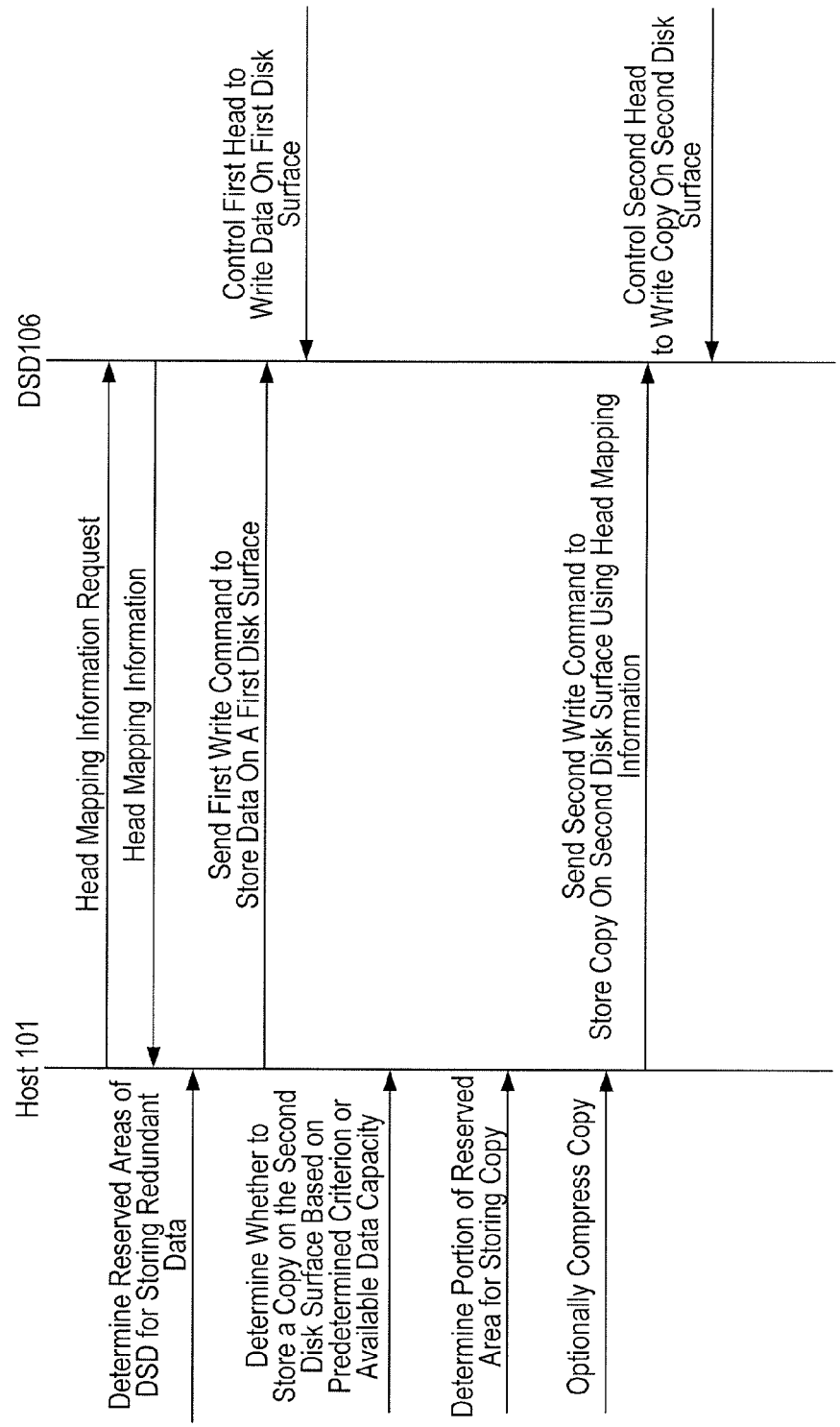
FIG. 5A is a sequence diagram for a mirroring data protection process according to an embodiment.

FIG. 5A is a sequence diagram for a mirroring data protection process according to an embodiment that can be performed by CPU 108 of host 101 executing DSD driver 12 and by controller 120 of DSD 106 executing DSD firmware 14. As shown in FIG. 5A, host 101 sends DSD 106 a request for head mapping information. This request can be performed upon an initial connection between host 101 and DSD 106. In other embodiments, the request for head mapping information can be omitted and DSD 106 may send HM information 16 to host 101 without a request. DSD 106 then sends head mapping information 16 to host 101 via host interface 126.

Host 101 determines reserved areas of DSD 106 for storing redundant data based on the head mapping information 16 received from DSD 106. In more detail, a file system of host 101 may assign unused LBAs for different disk surfaces to hidden files to determine the reserved areas.

Host 101 then sends a first write command to DSD 106 to store data on a first disk surface of DSD 106. More specifically, CPU 108 can send the first write command indicating at least one LBA for storing the data on the first disk surface. In response, controller 120 controls a first head (e.g., head 154) to write the data for the write command on a first disk surface (e.g., disk surface 134).

In the embodiment of FIG. 5A, CPU 108 determines whether to store a copy of the data on a second disk surface based on a predetermined criterion or an available data capacity of DSD 106. In one implementation, CPU 108 compares priority information for the data of the write command with predetermined criterion to determine whether to store a copy of the data from the first write command. In such implementations, the priority information can include at least one of a file type for the data, a directory location for the data, and a history of access for the data. For example, DSD driver 12 may identify a particular file type of the data as having a high or low priority and then determine to store a copy of the data on the second disk surface only if the file type indicates a high priority. In this example, the predetermined criterion can include a list of high priority file types that should have redundant data stored in DSD 106.

In another example, a particular directory location of the data such as files located in a "My Documents" folder, may indicate that a copy should be stored on the second disk surface. In this example, the predetermined criterion can allow for redundant data to be stored for data from particular folders.

In yet another example, DSD driver 12 may monitor the access to particular files such that the priority information indicates a level or frequency of access of the data. In such an example, the predetermined criterion can include a certain minimum number of accesses within a predetermined time period.

CPU 108 may also adjust the predetermined criterion based on a remaining available data capacity of one or more disk surfaces of DSD 106. For example, the criterion may be heightened as the available data capacity of DSD 106 decreases. In the examples discussed above, a certain file type or directory location may no longer correspond to a high priority such that redundant data is not stored for such file types or directory locations. A minimum level or frequency of access can be increased such that data will need to be accessed more frequently in order to have redundant data stored for it. Along these lines, DSD driver 12 may also provide a user interface to allow a user of host 101 to adjust the predetermined criterion used to determine which data should have redundant data.

In the example of FIG. 5A, CPU 108 can determine whether to send the second write command to store the copy based on whether a remaining available data capacity of one or more disk surfaces of DSD 106 is greater than a threshold data capacity. For example, host 101 may initially send a second write command to store copies for all data, but as the available data capacity of DSD 106 decreases, host 101 may become more selective about which data will have a copy. In one implementation, a file system of host 101 can reassign some of the unused addresses for reserved areas 146, 148, 150, and 152 when a threshold data capacity is reached to allow for more data to be stored in DSD 106. In this regard, the file system may create hidden files that serve as placeholders for the reserved areas and are not visible to a user of host 101. As the remaining available data capacity of DSD 106 decreases, host 101 may decrease the size of the hidden files to allow for more data to be stored in DSD 106. After reassigning addresses for the reserved areas, DSD driver 12 can update head mapping information 16 to reflect the new reserved areas of unused addresses.

CPU 108 can determine a portion of a reserved area for storing the copy using head mapping information 16 or a hidden file that has been assigned for the reserved area. In this way, CPU 108 can identify at least one unused address associated with the second disk surface for storing the copy of the data. The copy of the data may also be compressed by CPU 108 before sending a second write command to DSD 106 for storing the copy. In other embodiments, the copy may be compressed by controller 120 of DSD 106 before storing the compressed copy.

The second write command can then be sent via data storage interface 119 and indicate at least one address for storing the copy on the second disk surface. For example, with reference to head mapping information 16 in FIG. 3, CPU 108 may identify unused LBAs within pool O (associated with head 158 which writes on disk surface 138 in FIG. 2) for storing a copy of data addressed with LBAs from pool A (associated with head 154 which writes on disk surface 134 in FIG. 2) of used LBAs. The copy of data stored from the first write command on disk surface 134 by head 154 is then stored in reserved area 150 on disk surface 138 by head 158. By having access to head mapping information 16, host 101 can assign addresses to the redundant data so that it is stored on a different disk surface than the data sent for the first write command.

For its part, controller 120 of DSD 106 receives the second write command via host interface 126 and controls a second head (e.g., head 158) to write the copy of the data on the second disk surface (e.g., disk surface 138). As discussed above, in some embodiments, CPU 108 may send one command to effect the writes of the data and the copy of the data to the two disk surfaces.

Figure 5B:
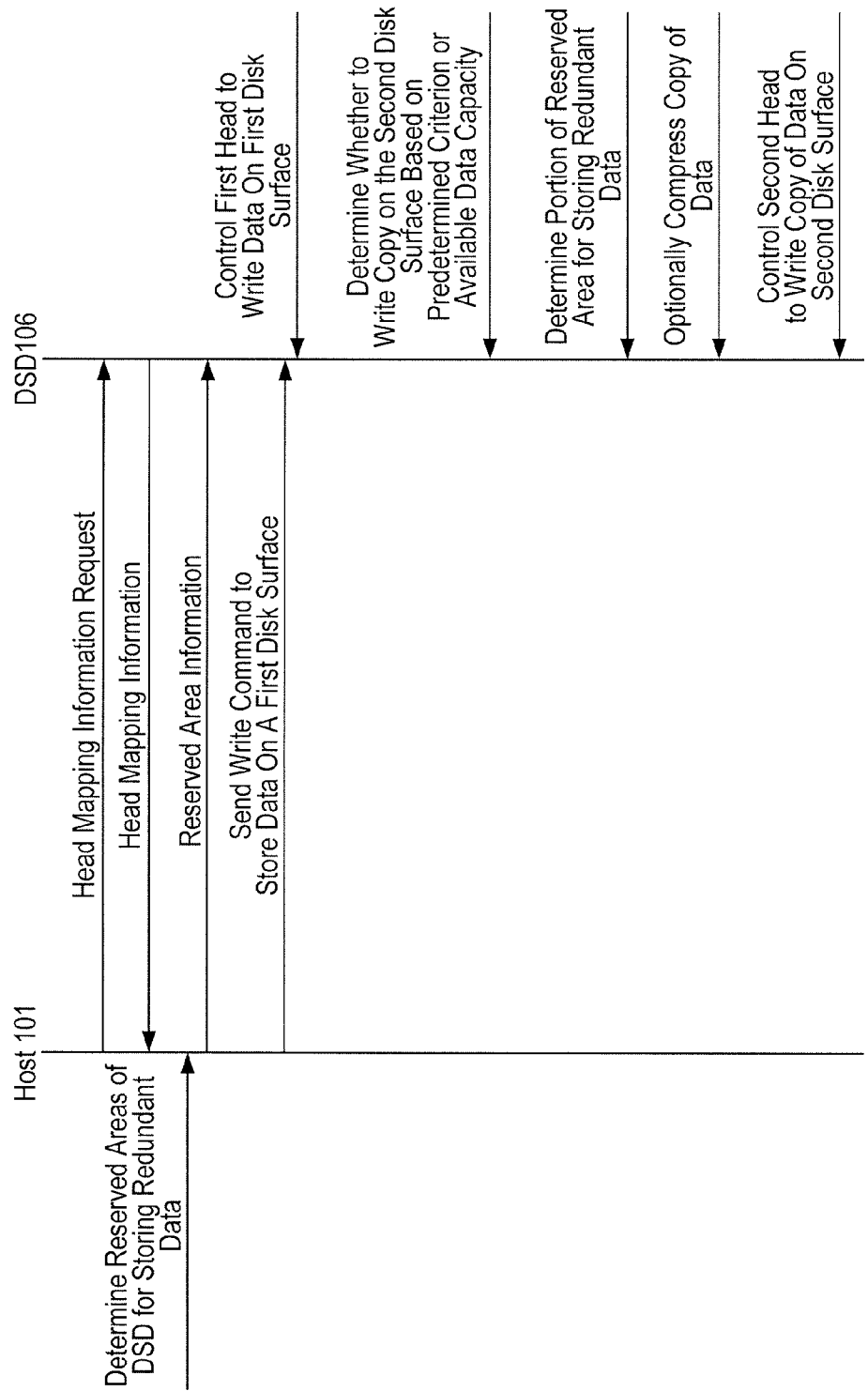
FIG. 5B is a sequence diagram for a mirroring data protection process according to another embodiment.

FIG. 5B is a sequence diagram for a different mirroring data protection process according to an embodiment that can be performed by CPU 108 of host 101 executing DSD driver 12 and by controller 120 of DSD 106 executing DSD firmware 14. The sequence of FIG. 5B differs from that of FIG. 5A in that controller 120 of DSD 106 determines whether and where to store a copy of the data rather than CPU 108 of host 101.

As with the sequence of FIG. 5A, host 101 sends DSD 106 a request for head mapping information and DSD 106 sends head mapping information 16 to host 101 via host interface 126. Host 101 also determines reserved areas of DSD 106 for storing redundant data based on the head mapping information 16 received from DSD 106. Unlike the sequence of FIG. 5A, host 101 sends reserved area information back to DSD 106 to identify the reserved areas on each of the disk surfaces of DSD 106. In one implementation, the reserved area information can include logical address ranges for the reserved areas.

Host 101 then sends a write command to DSD 106 to store data on a first disk surface of DSD 106. In response, controller 120 controls a first head (e.g., head 154) to write the data for the write command on a first disk surface (e.g., disk surface 134).

In the embodiment of FIG. 5B, controller 120 determines whether to store a copy of the data on a second disk surface based on a predetermined criterion or an available data capacity of DSD 106. In one implementation, controller 120 compares priority information for the data of the write command with predetermined criterion to determine whether to store a copy of the data from the first write command. In such implementations, the priority information can be received from host 101 as part of a hinting provided by host 101 as to a priority level of the data. In other implementations, controller 120 may learn access patterns for the data and compare the access patterns to a predetermined criterion. In such an example, the predetermined criterion can include a certain minimum number of accesses within a predetermined time period.

Controller 120 may also adjust the predetermined criterion based on a remaining available data capacity of one or more disk surfaces of DSD 106. For example, the predetermined criterion may be heightened as the available data capacity of DSD 106 decreases. In the examples discussed above, a certain priority level for the data or a minimum level or frequency of access can be increased such that data will need to have a higher priority level or be accessed more frequently in order to have redundant data stored for it.

In the example of FIG. 5B, controller 120 can also or alternatively determine whether to write a copy of the data based on a remaining available data capacity of one or more disk surfaces. For example, controller 120 may initially write copies for all data, but as the available data capacity of DSD 106 decreases, controller 120 may become more selective about which data will have a copy.

Controller 120 can use the reserved area information received from host 101 to determine a portion of a reserved area for storing the copy. Specifically, controller 120 may identify at least one unused address associated with the second disk surface for storing the copy of the data. The copy of the data may also be compressed by controller 120 before writing it to the second disk surface. Controller 120 then controls a second head (e.g., head 158) to write the copy of the data on the second disk surface (e.g., disk surface 138).

Figure 6A:
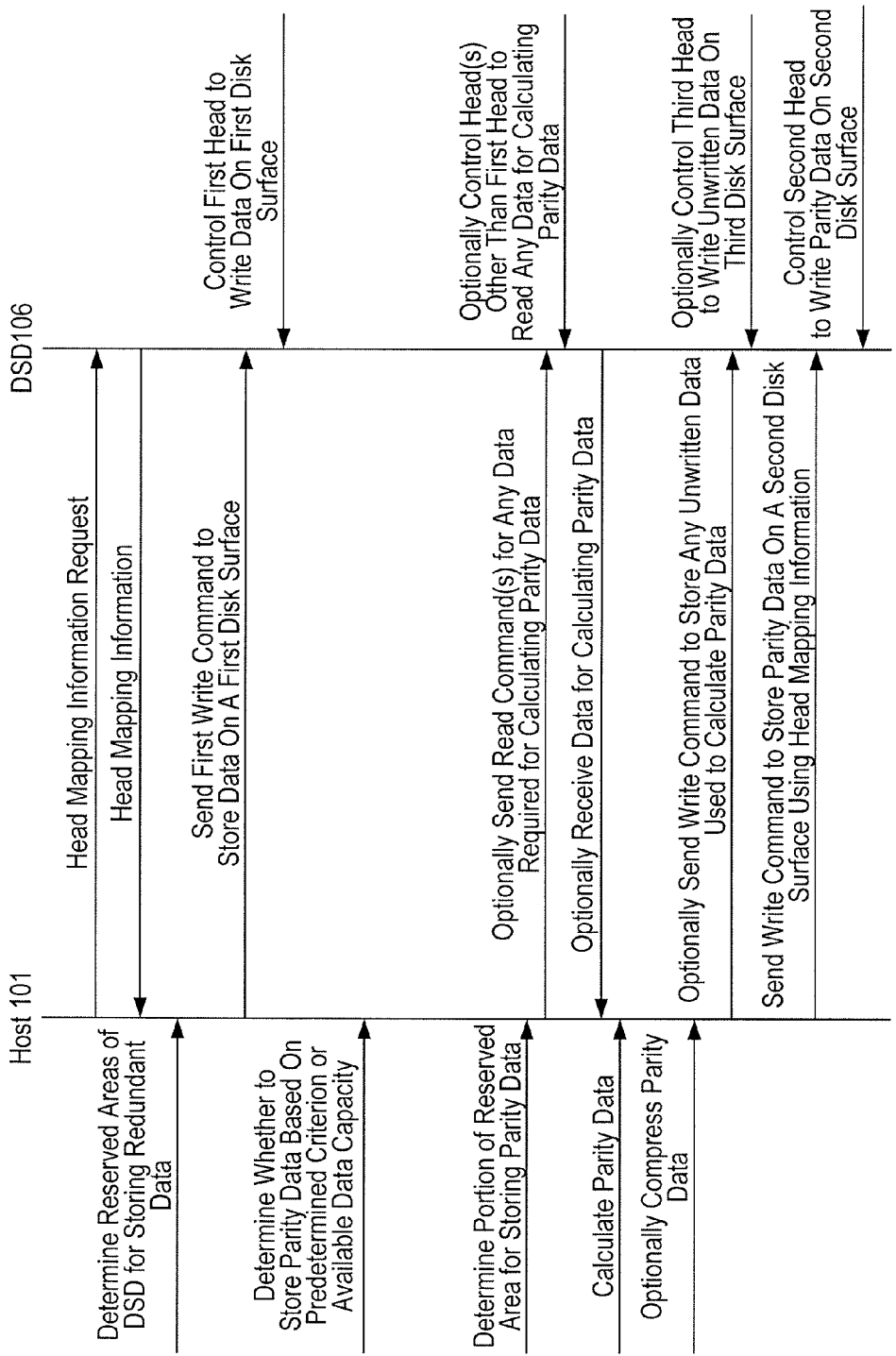
FIG. 6A is a sequence diagram for a parity data protection process according to an embodiment.

FIG. 6A is a sequence diagram for a parity data protection process that can be performed by CPU 108 executing DSD driver 12 and by controller 120 executing DSD firmware 114 according to an embodiment. The sequence of FIG. 6A differs from the sequences of FIGS. 5A and 5B in that the redundant data is parity data that can be used to reconstruct the data for the first write command rather than a copy of the data. As shown in FIG. 6A, host 101 sends DSD 106 a request for head mapping information. This request can be performed upon an initial connection between host 101 and DSD 106. In other embodiments, the request for head mapping information can be omitted and DSD 106 may send HM information 16 to host 101 without a request. CPU 108 of host 101 then determines reserved areas of DSD 106 for storing redundant data.

Host 101 sends a first write command to DSD 106 to store data on a first disk surface of DSD 106. More specifically, CPU 108 sends the first write command via data storage interface 119 to indicate at least one LBA for storing the data. In response, controller 120 controls a first head (e.g., head 154) to write the data for the write command on the first disk surface (e.g., disk surface 134).

In some implementations, CPU 108 compares priority information for the data of the write command with a predetermined criterion to determine whether to store parity data for the data from the first write command. As in the example of FIG. 5A, the priority information can include at least one of a file type for the data, a directory location for the data, and a history of access for the data. The predetermined criterion can also be adjusted by host 101 based on a remaining available data capacity one or more disk surfaces of DSD 106. In some implementations, DSD driver 12 may also provide a user interface to allow a user of host 101 to adjust the predetermined criterion used to determine whether to store redundant data.

In the example of FIG. 6A, CPU 108 can determine whether to send a write command to store the parity data based on the comparison with the predetermined criterion or based on a remaining available data capacity of one or more disk surfaces of DSD 106. In this regard, less redundant data may be stored in DSD 106 as the available data capacity decreases. In one implementation, a file system of host 101 can reassign some of the unused addresses previously assigned for reserved areas 146, 148, 150, and 152, and update head mapping information 16 accordingly.

If it is determined to store parity data, CPU 108 determines a portion of a reserved area for storing the parity data. CPU 108 can determine the portion of the reserved area using head mapping information 16 or a hidden file that has been assigned for the reserved area. In this way, CPU 108 can identify at least one unused address associated with the second disk surface for storing the parity data.

CPU 108 calculates the parity data if it is determined to store the parity data. To calculate the parity data, CPU 108 may need to read data of the same size from one or more disk surfaces of DSD 106 other than the first disk surface and/or use other data of the same size to be stored in DSD 106 in a location other than the first disk surface. In one example, CPU 108 may calculate the parity data by performing an XOR operation on the data from the first write command and data stored on a third disk surface (e.g., disk surface 142).

If data needs to be read from DSD 106 to calculate the parity data, CPU 108 sends a read command for such data and controller 120 controls a head other than the first head to read the requested data. The data for calculating the parity data is then received by host 101 from DSD 106.

CPU 108 may also use head mapping information 16 to identify data stored on or to be stored on a particular disk surface that is used to calculate the parity data. With reference to the example of head mapping information 16 provided in FIG. 3, CPU 108 may identify N as an unused pool of LBAs for assigning to parity data generated by data addressed within used LBA pools A and C. With access to head mapping information 16, host 101 is able to assign LBAs to any unwritten data used to calculate the parity data and to assign LBAs to the parity data such that the parity data can be stored on a different disk surface than the data used to calculate the parity data. Either the data stored on the first disk surface or the other data used to calculate the parity data can then be reconstructed if needed using the parity data.

If using unwritten data to calculate the parity data, CPU 108 may send a write command to store any unwritten data that was used to calculate the parity data. Controller 120 of DSD 106 then receives the write command for the unwritten data and controls a third head to write the unwritten data on a third disk surface.

CPU 108 may also optionally compress the parity data before sending the parity data in a write command for storing the parity data on a second disk surface. In other implementations, the parity data may be compressed by controller 120 of DSD 106 before storing the parity data. The write command for the parity data is sent using data storage interface 119 to indicate at least one unused LBA for storing the parity data. For its part, controller 120 of DSD 106 receives the write command via host interface 126 and controls a second head (e.g., head 158) to write the parity data on the second disk surface (e.g., disk surface 138).

Figure 6B:
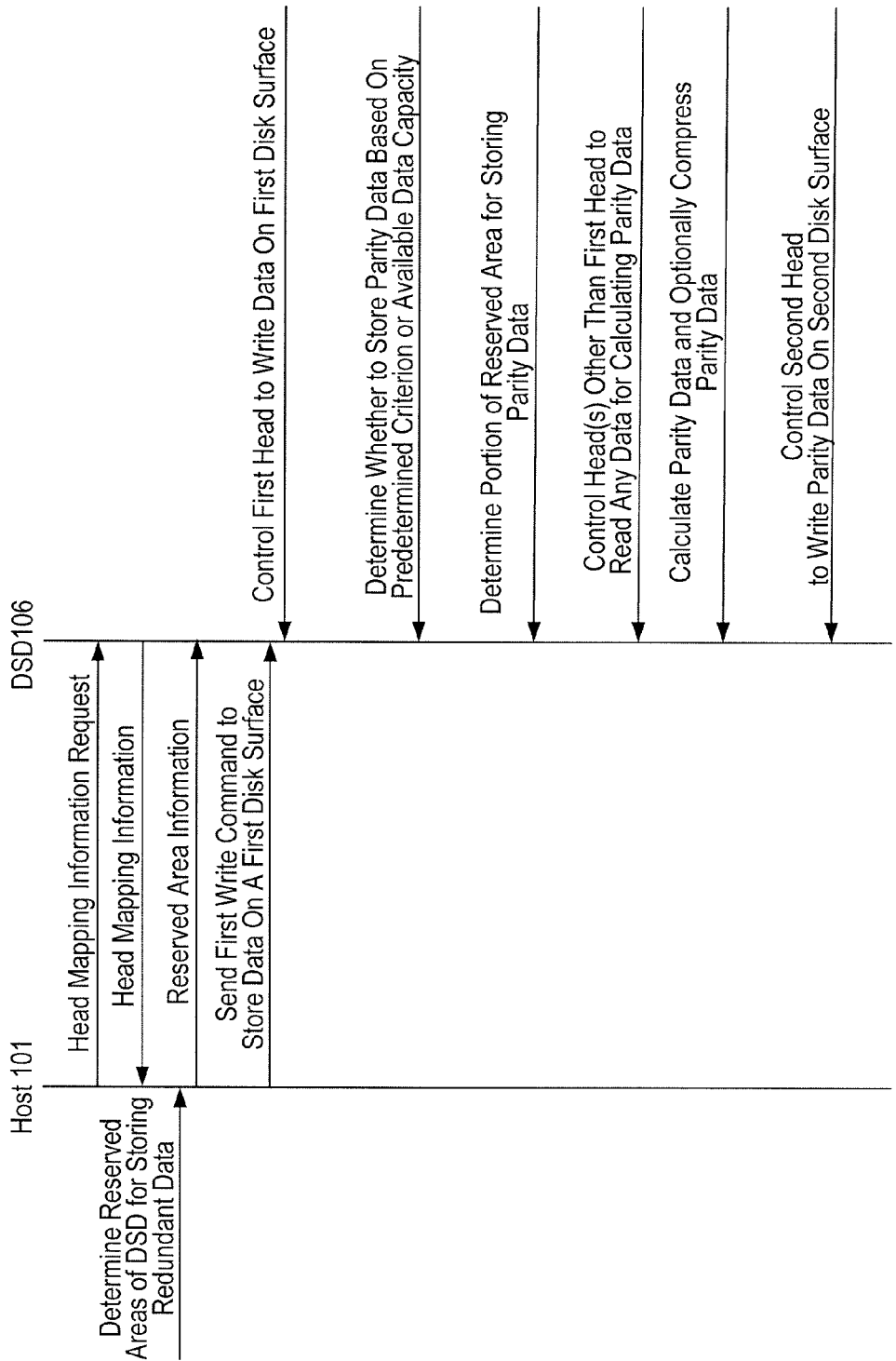
FIG. 6B is a sequence diagram for a parity data protection process according to another embodiment.

FIG. 6B is a sequence diagram for a parity data protection process that can be performed by CPU 108 executing DSD driver 12 and by controller 120 executing DSD firmware 114 according to an embodiment. The sequence of FIG. 6B differs from the sequence of FIG. 6A in that controller 120 of DSD 106 determines whether and where to store the parity data rather than CPU 108 of host 101. In addition, controller 120 calculates the parity data in FIG. 6B.

As with the sequence of FIG. 6A, host 101 sends DSD 106 a request for head mapping information. This request can be performed upon an initial connection between host 101 and DSD 106. In other embodiments, the request for head mapping information can be omitted and DSD 106 may send HM information 16 to host 101 without a request. CPU 108 of host 101 then determines reserved areas of DSD 106 for storing redundant data. Unlike the sequence of FIG. 6A, host 101 sends reserved area information back to DSD 106 to identify the reserved areas on each of the disk surfaces of DSD 106. In one implementation, the reserved area information can include logical address ranges for the reserved areas.

Host 101 sends a first write command to DSD 106 to store data on a first disk surface of DSD 106. In response, controller 120 controls a first head (e.g., head 154) to write the data for the write command on the first disk surface (e.g., disk surface 134).

In the embodiment of FIG. 6B, controller 120 determines whether to store parity data on a second disk surface based on a predetermined criterion or an available data capacity of DSD 106. In one implementation, controller 120 compares priority information for the data of the write command with a predetermined criterion to determine whether to store parity data. In such implementations, the priority information can be received from host 101 as part of a hinting provided by host 101 as to a priority level of the data. In other implementations, controller 120 may learn access patterns for the data and compare the access patterns to a predetermined criterion. In such an example, the predetermined criterion can include a certain minimum number of accesses within a predetermined time period.

Controller 120 may also adjust the predetermined criterion based on a remaining available data capacity of one or more disk surfaces of DSD 106. For example, the predetermined criterion may be heightened as the available data capacity of DSD 106 decreases. In the examples discussed above, a certain priority level for the data or a minimum level or frequency of access can be increased such that data will need to have a higher priority level or be accessed more frequently in order to have redundant data stored for it.

In the example of FIG. 6B, controller 120 can also or alternatively determine whether to write the parity data based on a remaining available data capacity of one or more disk surfaces. For example, controller 120 may initially write parity data for all data, but as the available data capacity of DSD 106 decreases, controller 120 may become more selective about which data will have parity data.

If it is determined to store parity data, controller 120 determines a portion of a reserved area for storing the parity data. Controller 120 can determine the portion of the reserved area using the reserved information received from host 101. In this way, controller 120 can identify at least one unused address associated with the reserved area of the second disk surface for storing the parity data.

Controller 120 calculates the parity data if it is determined to store the parity data and optionally compresses the parity data before storing it. To calculate the parity data, controller 120 reads data of the same size from one or more disk surfaces other than the first disk surface. In one example, controller 120 may calculate the parity data by performing an XOR operation on the data from the first write command and data stored on a third disk surface (e.g., disk surface 142).

Controller 120 may also use head mapping information 16 to identify data stored on a particular disk surface that is used to calculate the parity data. To write the parity data, controller 120 controls a second head (e.g., head 158) to write the parity data on the second disk surface (e.g., disk surface 138). Either the data stored on the first disk surface or the other data used to calculate the parity data can then be reconstructed if needed using the parity data stored on the second disk surface.

Figure 7A:
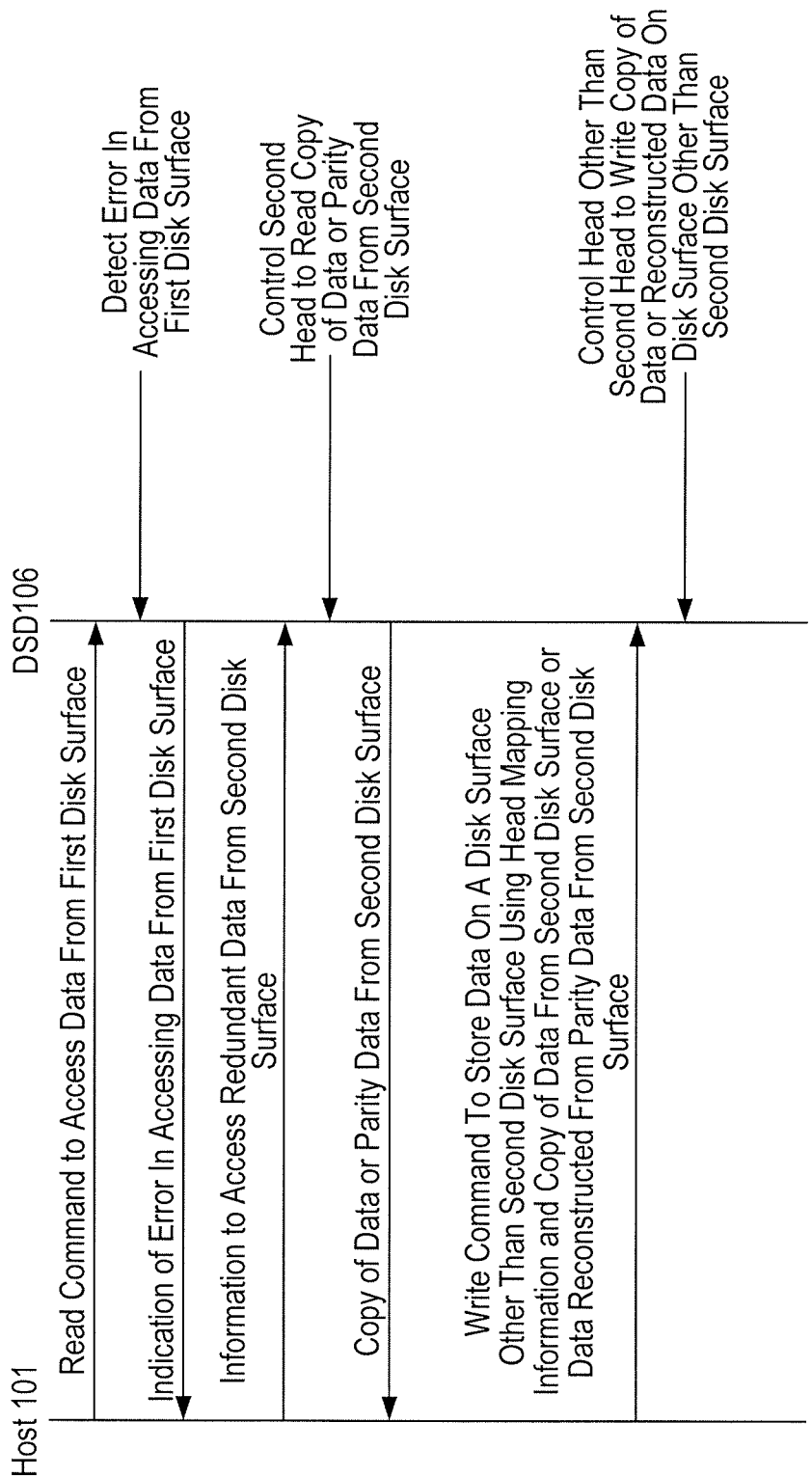
FIG. 7A is a sequence diagram for an error handling process according to an embodiment.

FIG. 7A is a sequence diagram for an error handling process that can be performed by CPU 108 executing DSD driver 12 and by controller 120 executing DSD firmware 114 according to an embodiment. As shown in FIG. 7A, host 101 sends a read command to DSD 106 to access data from a first disk surface (e.g., disk surface 134) of DSD 106. In reading the data from the first disk surface, DSD 106 detects an error such that the data cannot be retrieved from the first disk surface. Controller 120 of DSD 106 sends an indication of the error, such as an error message, to host 101 via host interface 126. The indication of the error may or may not be reported to an Operating System (OS) of host 101. In one implementation, DSD driver 12 executing at host 101 may receive the indication of the error without reporting the error to the OS of host 101.

In response, CPU 108 using DSD driver 12 sends information to DSD 106 via data storage interface 119 to allow DSD 106 to access redundant data from a second disk surface (e.g., disk surface 138). The information provided to DSD 106 can, for example, include a vendor specific command for error handling or it can include a read command indicating an address assigned to the redundant data stored on the second disk surface.

Controller 120 then controls the second head (e.g., head 158) to read the redundant data from the second disk surface (e.g., disk surface 138), and sends the redundant data to host 101 via host interface 126. If the redundant data is a copy of the data stored on the first disk surface, DSD driver 12 executing on host 101 may satisfy the read command for the data from the first disk surface using the copy of the data. If the redundant data is parity data, DSD driver 12 may need to send one or more additional read commands to retrieve data from other disk surfaces to reconstruct the data stored on the first disk surface using the parity data. In one implementation, DSD driver 12 may cause CPU 108 to reconstruct the data from the first disk surface by performing an XOR operation with data from a third disk surface and the parity data from the second disk surface.

In the example sequence of FIG. 7A, host 101 attempts to restore the data in DSD 106 that could not be accessed from the first disk surface. In this regard, host 101 sends a write command to store the data on a disk surface other than the second disk surface using head mapping information 16 and a copy of the data read from the second surface or data reconstructed from parity data read from the second surface. Host 101 sends a write command to store the copy of the data or the reconstructed data onto a third or fourth disk surface. Controller 120 of DSD 106 can then control the corresponding head to write the copy of the data or the reconstructed data on a disk surface other than the second disk surface where the redundant data is stored.

Figure 7B:
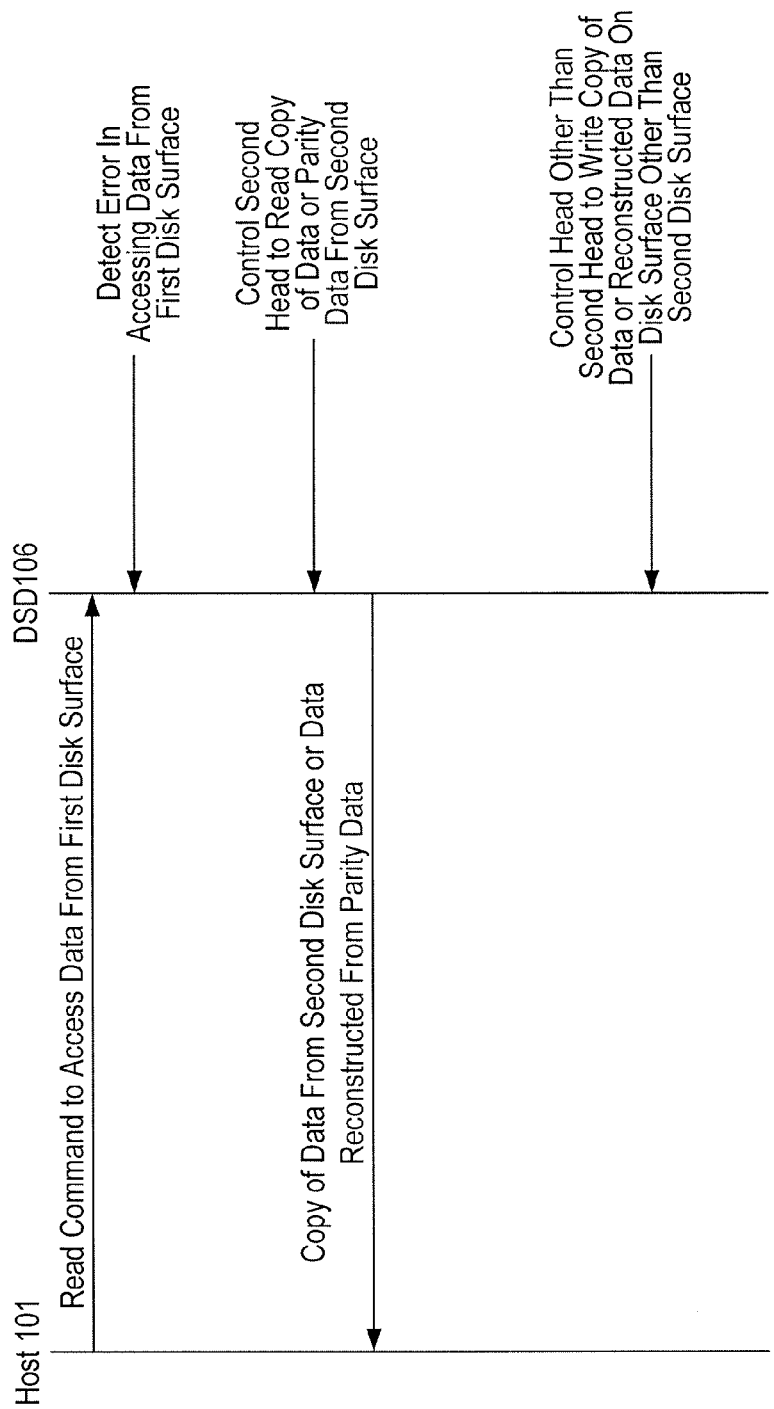
FIG. 7B is a sequence diagram for an error handling process according to another embodiment.

FIG. 7B is a sequence diagram for a different error handling process that can be performed by controller 120 executing DSD firmware 114 according to an embodiment. The sequence of FIG. 7B differs from that of FIG. 7A in that controller 120 sends a copy of the data or a reconstructed copy of the data to host 101 without sending an indication of an error in accessing data from the first disk surface or without receiving additional information from host 101 on accessing the redundant data from the second disk surface.

As shown in FIG. 7B, host 101 sends a read command to DSD 106 to access data from a first disk surface (e.g., disk surface 134) of DSD 106. In reading the data from the first disk surface, DSD 106 detects an error such that the data cannot be retrieved from the first disk surface.

Controller 120 then controls a second head (e.g., head 158) to read a copy of the data from a second disk surface (e.g., disk surface 138) or parity data from the second disk surface. If a copy of the data is read, controller 120 sends the copy to host 101 via host interface 126. If parity data is read from the second surface, controller 120 can use the parity data and other data stored in DSD 106 to reconstruct the data stored on the first disk surface before sending the reconstructed data to host 101 via host interface 126.

In the example sequence of FIG. 7B, host 101 attempts to restore the data in DSD 106 that could not be accessed from the first disk surface. Specifically, controller 120 restores the data by controlling a head other than the second head to write a copy of the data or reconstructed data on a disk surface other than the second disk surface where the redundant data is stored.

By storing redundant data on a different disk surface as in the processes discussed above, it is ordinarily possible to protect data stored within a single DSD from problems with a particular disk surface or head. Such redundancy can allow for improved reliability of the DSD.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A host, comprising:
   an interface for communicating with a Data Storage Device (DSD) including a plurality of disk surfaces for storing data; and
   a processor configured to:
      receive head mapping information from the DSD using the interface, the head mapping information associating addresses for data with different disk surfaces of the plurality of disk surfaces; and
      send at least one write command to the DSD using the interface to store data on a first disk surface of the plurality of disk surfaces and to store corresponding redundant data on a second disk surface of the plurality of disk surfaces using the head mapping information.

2. The host of claim 1, wherein the processor is further configured to determine whether to store the redundant data on the second disk surface based on comparing priority information for the data with a predetermined criterion.

3. The host of claim 2, wherein the priority information includes at least one of a file type for the data, a directory location for the data, and a history of access for the data.

4. The host of claim 2, wherein the processor is further configured to adjust the predetermined criterion based on a remaining available data capacity of one or more of the plurality of disk surfaces.

5. The host of claim 1, wherein the processor is further configured to determine whether to store the redundant data on the second disk surface based on an available data capacity of one or more of the plurality of disk surfaces.

6. The host of claim 1, wherein the processor is further configured to determine using the head mapping information a reserved area of the second disk surface that is reserved for storing redundant data for data written on other disk surfaces of the plurality of disk surfaces.

7. The host of claim 6, wherein the processor is further configured to adjust a size of the reserved area based on a remaining available data capacity of one or more of the plurality of disk surfaces.

8. The host of claim 1, wherein the processor is further configured to compress the redundant data for storing on the second disk surface.

9. The host of claim 1, wherein the processor is further configured to:
   receive an indication from the DSD via the interface indicating an error in accessing the data from the first disk surface; and
   send a read command to the DSD using the interface so that the DSD can use the redundant data on the second disk surface.

10. The host of claim 1, wherein the redundant data is parity data that can be used to reconstruct the data written on the first disk surface or data stored or to be stored on a third disk surface of the plurality of disk surfaces.

11. A Data Storage Device (DSD), comprising:
    a plurality of disk surfaces for storing data;
    a plurality of heads with each head of the plurality of heads configured to write data on and read data from a respective disk surface of the plurality of disk surfaces;
    an interface for communicating with a host; and
    a controller configured to:
       send, using the interface, head mapping information to the host, the head mapping information associating addresses for data with different disk surfaces of the plurality of disk surfaces;
       receive, using the interface, a write command from the host to store data on a first disk surface of the plurality of disk surfaces;
       control a first head of the plurality of heads to write the data of the write command on the first disk surface; and
       control a second head of the plurality of heads to write redundant data for the data of the write command on a second disk surface.

12. The DSD of claim 11, wherein the redundant data is written in a reserved area of the second disk surface that is reserved for storing redundant data for data written on other disk surfaces of the plurality of disk surfaces.

13. The DSD of claim 11, wherein the controller is further configured to compress the redundant data before controlling the second head to write the redundant data on the second disk surface.

14. The DSD of claim 11, wherein the controller is further configured to:
    detect an error in accessing the data from the first disk surface; and
    control the second head to access the redundant data from the second disk surface.

15. The DSD of claim 14, wherein the controller is further configured to:
    send an indication to the host via the interface indicating an error in accessing the data from the first disk surface; and
    receive a read command via the interface from the host to access the redundant data on the second disk surface.

16. The DSD of claim 11, wherein the redundant data is parity data that can be used to reconstruct the data written on the first disk surface or data stored or to be stored on a third disk surface of the plurality of disk surfaces.

17. The DSD of claim 11, wherein the controller is further configured to determine whether to write the redundant data on the second disk surface based on a predetermined criterion.

18. The DSD of claim 17, wherein, in determining whether to write the redundant data on the second disk surface, the controller is further configured to compare priority information received from the host for the data with the predetermined criterion or compare access patterns for the data with the predetermined criterion.

19. The DSD of claim 17, wherein the controller is further configured to adjust the predetermined criterion based on a remaining available data capacity of one or more of the plurality of disk surfaces.

20. The DSD of claim 11, wherein the controller is further configured to determine whether to store the redundant data on the second disk surface based on an available data capacity of one or more of the plurality of disk surfaces.

21. A method of managing data stored in a Data Storage Device (DSD) including a plurality of disk surfaces for storing data, the method comprising:
   receiving head mapping information from the DSD, the head mapping information associating addresses for data with different disk surfaces of the plurality of disk surfaces;
   storing data on a first disk surface of the plurality of disk surfaces; and
   storing redundant data for the data stored on the first disk surface, wherein the redundant data is stored on a second disk surface of the plurality of disk surfaces using the head mapping information.

22. The method of claim 21, further comprising determining whether to store the redundant data on the second disk surface based on comparing priority information for the data stored on the first disk surface with a predetermined criterion.

23. The method of claim 22, wherein the priority information includes at least one of a file type for the data, a directory location for the data, and a history of access for the data.

24. The method of claim 22, further comprising adjusting the predetermined criterion based on a remaining available data capacity of one or more of the plurality of disk surfaces.

25. The method of claim 21, further comprising determining whether to store the redundant data on the second disk surface based on an available data capacity of one or more of the plurality of disk surfaces.

26. The method of claim 21, further comprising determining using the head mapping information a reserved area of the second disk surface that is reserved for storing redundant data for data written on other disk surfaces of the plurality of disk surfaces.

27. The method of claim 26, further comprising adjusting a size of the reserved area based on a remaining available data capacity of one or more of the plurality of disk surfaces.

28. The method of claim 21, further comprising compressing the redundant data before storing the compressed redundant data on the second disk surface.

29. The method of claim 21, further comprising:
   receiving an indication from the DSD indicating an error in accessing the data from the first disk surface; and
   sending information to the DSD so that the DSD can use the redundant data on the second disk surface.

30. The method of claim 21, wherein the redundant data is parity data that can be used to reconstruct the data written on the first disk surface or data stored or to be stored on a third disk surface of the plurality of disk surfaces.

31. A non-transitory computer-readable medium storing computer executable instructions for managing data in a Data Storage Device (DSD) including a plurality of disk surfaces for storing data, wherein when the computer executable instructions are executed by a processor, the computer executable instructions cause the processor to:
   receive head mapping information from the DSD, the head mapping information associating addresses for data with different disk surfaces of the plurality of disk surfaces;
   store data on a first disk surface of the plurality of disk surfaces; and
   store redundant data for the data stored on the first disk surface, wherein the redundant data is stored on a second disk surface of the plurality of disk surfaces using the head mapping information.

* * * * *